United States Patent [19]
Parsons

[11] Patent Number: 5,092,195
[45] Date of Patent: Mar. 3, 1992

[54] BALANCERS

[75] Inventor: Bryan N. V. Parsons, Stoney Stanton, England

[73] Assignee: Jaguar Cars Limited, United Kingdom

[21] Appl. No.: 681,410

[22] Filed: Apr. 4, 1991

Related U.S. Application Data

[63] Continuation of Ser. No. 372,285, Jun. 27, 1989, abandoned.

[30] Foreign Application Priority Data

Jul. 6, 1988 [GB] United Kingdom ............... 8816091

[51] Int. Cl.⁵ ............................................. F16F 15/22
[52] U.S. Cl. .................................. 74/573 R; 74/572; 310/114
[58] Field of Search ................... 74/572, 573 R, 574; 310/46, 74, 103, 105, 114, 116

[56] References Cited

U.S. PATENT DOCUMENTS

| | | | |
|---|---|---|---|
| 2,764,721 | 9/1956 | Johnson | 74/572 |
| 3,237,480 | 3/1966 | Phelon | 74/572 |
| 3,675,506 | 7/1972 | Leone | 74/572 |
| 3,790,831 | 2/1974 | Morreale | 74/572 |
| 4,021,086 | 5/1977 | Rajsigl | 74/572 |
| 4,241,620 | 12/1980 | Pichl et al. | 74/572 X |
| 4,458,156 | 7/1984 | Maucher et al. | 74/572 X |
| 4,730,154 | 3/1988 | Pinson | 74/572 X |
| 4,787,265 | 11/1988 | Mishiro | 310/49 R X |
| 4,892,467 | 1/1990 | Crofoot | 310/114 X |

FOREIGN PATENT DOCUMENTS 956443 5/1959 United Kingdom ............ 74/573 R

OTHER PUBLICATIONS

Patent Abstracts of Japan, vol. 7, No. 215, 22nd Sep. 1983.
Elektrie, vol. 22, No. 4, 1968, p. U58, E. R. Laithwaite.
Automotive Engineering, vol. 84, No. 2, Feb. 1976, pp. 30–31; "Balancing the Four-Cylinder Engine".

Primary Examiner—Vinh T. Luong
Attorney, Agent, or Firm—Davis, Bujold & Streck

[57] ABSTRACT

A balancer has a ferromagnetic weight mounted for rotation about an axis, the center of mass of the weight is offset from the axis of rotation and a series of angularly spaced coils are provided concentrically about the axis of rotation and spaced radially of the weight. A switching device is provided for sequential energization of the coils so that the magnetic field generated by each coil will cause the weight to rotate, energization of the coils being synchronized so that rotation of the weight will produce an appropriate balancing motion.

4 Claims, 1 Drawing Sheet

BALANCERS

This is a continuation of copending application Ser. No. 07/372,285 filed on June 27, 1989 now abandoned.

BACKGROUND TO THE INVENTION

The present invention relates to balancers for internal combustion engines or other reciprocating machines.

It is known to provide balancers for internal combustion engines, in which weights are provided on counter-rotating shafts which are driven by the engine by, for example, belts or gear trains. Such balancers form an integral part of the engine and consequently require consideration from the initial design of the engine and will require modification during subsequent development of the engine.

The present invention provides a balancer which may be bolted or strapped onto an internal combustion engine or similar machine and as a result will significantly reduce design and development work on the engine.

SUMMARY OF THE INVENTION

According to one aspect of the present invention a balancer comprises a ferromagnetic weight mounted for rotation about an axis, the centre of mass of the weight being offset from its axis of rotation, a series of angularly spaced coils are provided concentrically about the axis of rotation and spaced radially of the weight, means being provided for sequential energisation of the coils so that the magnetic field generated by each coil will cause the weight to rotate, energisation of the coils being synchronised so that rotation of the weight will produce an appropriate balancing motion.

According to a preferred embodiment of the invention two ferromagnetic weights are mounted for rotation about axes parallel to one another, each weight having an associated set of coils. Preferably, the two sets of coils are energised so that they rotate at the same speed but in opposite directions, energisation of one set of coils being synchronised with that of the other set of coils such that the centres of mass of the weights will be 180° out of phase when they are disposed in the common axial plane of the weights.

The weights will preferably be driven at the speed of the machine or a multiple of the speed of the machine, in order to balance first or lower order vibrations in the machine.

Energisation of the coils may be controlled by suitable switching means, for example solid state switching means triggered by electromagnetic pickups associated with the crankshaft of the machine, the ignition timing, or the output of an alternator (magneto) driven by the machine; or by rotary switching means driven by the machine.

BRIEF DESCRIPTION OF THE DRAWINGS

An embodiment of the invention is now described, by way of example only, with reference to the accompanying drawings, in which.

DESCRIPTION OF A PREFERRED EMBODIMENT

Figure 1:
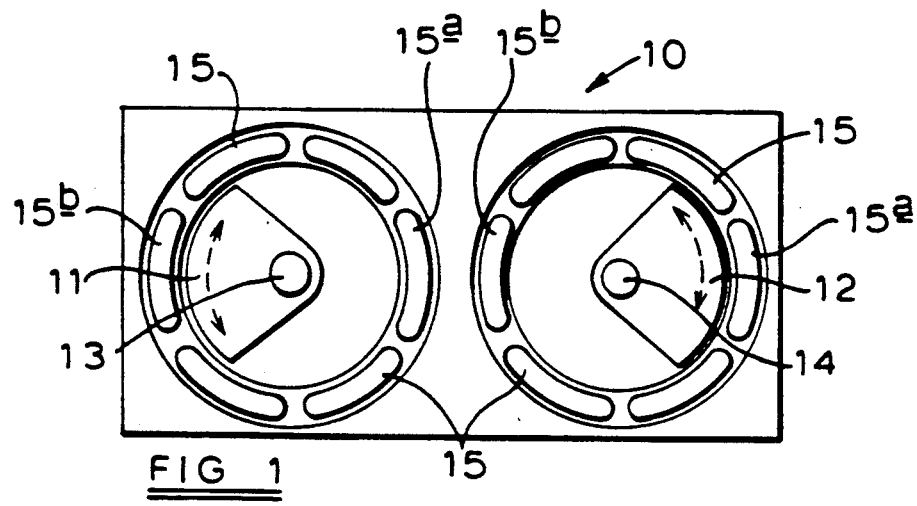
FIG. 1 illustrates a balancer in accordance with the present invention.

A balancer 10 comprises a pair of sectoral weights 11 and 12 of equal mass and dimensions which are mounted for rotation in a common plane about pivots 13 and 14 the axes of which are parallel to one another. Sets of electromagnetic coils 15 are angularly spaced about each pivot 13, 14 and are radially spaced therefrom so as to permit rotation of the weight 11, 12.

Figure 2:
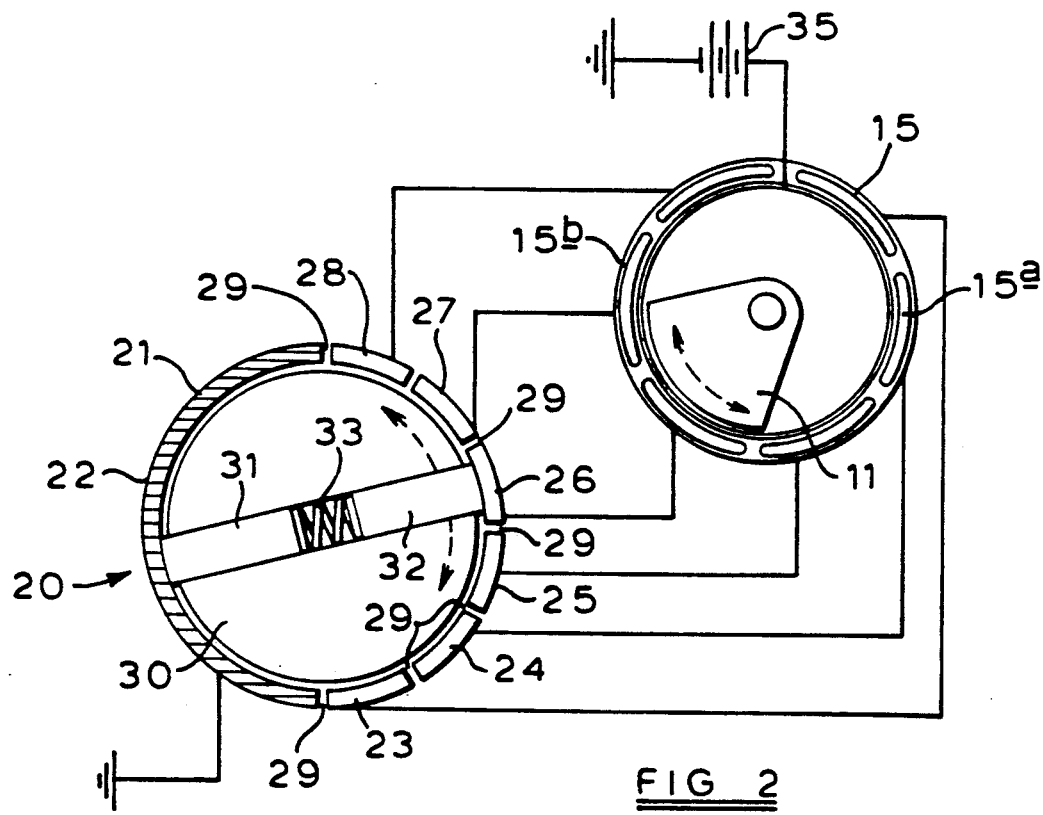
FIG. 2 illustrates means for controlling energisation of the sets of coils of the balancer illustrated in FIG. 1.

As illustrated in FIG. 2, the coils 15 of each set of coils are adapted to be energised sequentially, so that they will attract the associated weight 11, 12 and cause it to rotate. The coils 15 in each set of coils are energised sequentially, so as to make the weights 11 and 12 rotate at twice engine speed, but in opposite directions. Energisation of the two sets of coils 15 is synchronised so that when the centres of mass of the weights 11 and 12 are disposed in a common axial plane, weight 11 will be 180° out of phase with weight 12. In this manner, when the centres of mass of the weights are disposed in a common axial plane, the forces produced by rotation of the weights will cancel one another out so that rotation of the weights will produce a resultant vibration perpendicular to the common axial plane.

As illustrated in FIG. 2, energisation of the coils 15 of each set of coils may be controlled by a rotary switch 20 which is driven by the crankshaft of the engine. The rotary switch 20 comprises a stator 21 defining a series of cylindrical conductive sectors 22 to 28 each sector 22 to 28 being separated from the adjacent sector by insulative gaps 29 which may be air gaps or may be filled by an insulative material in order to provide a continuous cylindrical surface. Allowing for the insulative gaps 29, sector 22 extends around 180° of the cylindrical surface, while sectors 23 to 28 divide the remaining 180° into equal sectors.

A rotor 30 which is driven directly from the crankshaft of the engine, has a pair of diametrically mounted brushes 31, 32 which are electrically connected and urged apart into engagement with the cylindrical surface of the stator 21 by spring means 33.

As the rotor 30 of the switch 20 rotates, the brushes 31 and 32 will interconnect segment 22 with one of the segments 23 to 28.

The segment 22 is connected to earth and segments 23 to 28 are connected in sequence to one end of each of the coils 15. The other ends of each of the coils 15 are interconnected and connected to the positive terminal of a battery 35. The negative terminal of the battery is connected to earth. Consequently as the rotor 30 rotates, each coil 15 in sequence will be connected across the battery 35 thereby energising the coil.

Upon rotation of rotor 30, each segment 23 to 28 will be connected to segment 22 twice and consequently the coils 15 will be energised twice for each revolution of the engine. The weight 11 which is attracted by the magnetic fields produced by the coils 15 as they are energised, will consequently rotate at twice engine speed.

The coils 15 of the set of coils associated with the other weight 12, will be connected in similar manner to sectors 23 to 28 of the switch 20 but in reverse sequence so that the weights will rotate in opposite directions. Connection of the conductive sectors 23 to 28 is also arranged so that the coils 15a, 15b of one set, lying in the common axial plane will be energised 180° out of phase with the corresponding coils 15a, 15b of the other set.

Various modifications may be made without departing from the invention. For example, while in the above embodiment, the weights are of equal mass, the centres of mass spaced equally from their axes of rotation and are axially aligned, other configurations of weights may be used, for example, one weight may be offset axially from the other in order to produce a resultant couple as well as a balancing force. Alternatively the balancer may comprise a single weight which is driven in synchronisation with an out of balance component of the machine to provide a balancing force.

I claim:

1. A balancer comprising a first ferromagnetic weight mounted for rotation about an axis, the centre of mass of the weight being offset from its axis of rotation, a series of angularly spaced coils being provided concentrically about the axis of rotation and spaced radially of the weight, means being provided for sequential energisation of the coils to generate sequential magnetic fields thereby causing the weight to rotate in a desired direction and at a desired speed, said sequential energisation of the coils being synchronised to produce an appropriate balancing motion during rotation of the weight, and a second ferromagnetic weight being mounted for rotation about an axis parallel to said first ferromagnetic weight, said second ferromagnetic weight having an associated set of coils.

2. A balancer according to claim 1 in which the two sets of coils are energised so that the weights rotate at the same speed but in opposite directions, energisation of one set of coils being synchronised with that of the other set of coils so that the centres of mass of the weights will be 180° out of phase when they are disposed in the common axial plane of rotation of the weights.

3. A balancer according to claim 1 in which energisation of the coils is controlled by rotary switching means.

4. A balancer comprising a first ferromagnetic weight mounted for rotation about an axis, the centre of mass of the weight being offset from its axis of rotation, a series of angularly spaced coils being provided concentrically about the axis of rotation and spaced radially of the weight, means being provided for sequential energisation of the coils so that the magnetic field generated by each coil will cause the weight to rotate, and energisation of the coils being synchronised so that rotation of the weight will produce an appropriate balancing motion, in which a second ferromagnetic weigh is mounted for rotation about an axis parallel to said first ferromagnetic weight, said second ferromagnetic weight having an associated set of coils, the weights are driven at a multiple of the speed of a machine to which the balancer is attached, energisation of the coils is controlled by rotary switching means driven by the machine, and the rotary switching means comprises a stator defining a series of conductive sectors separated by insulative gaps, one sector extending around substantially 180° and the other sectors dividing the remaining 180° into equal sectors, a rotor adapted to be driven by the machine having a pair of diametrically mounted brushes which are electrically interconnected and urged apart into engagement with the conductive sectors, said other conductive sectors being connected in sequence to each set of coils the sequence of one set being the reverse of the other and the coils of one set lying in the common axial plane being energised 180° out of phase with the corresponding coils of the other set.

* * * * *